(12) United States Patent
Zoller et al.

(10) Patent No.: US 11,498,176 B2
(45) Date of Patent: Nov. 15, 2022

(54) AUTOMATED TOOL CLAMPING DEVICE, TOOL PRESETTING AND/OR TOOL MEASURING APPARATUS AND METHOD WITH AN AUTOMATED TOOL CLAMPING DEVICE

(71) Applicant: E. Zoller GmbH & Co. KG, Pleidelsheim (DE)

(72) Inventors: Alexander Zoller, Pleidelsheim (DE); Christian Pfau, Ingersheim (DE); Florian Huck, Pleidelsheim (DE)

(73) Assignee: E. ZOLLER GMBH & CO. KG EINSTELL-UND MESSGERÄTE, Pleidelsheim (DE)

( * ) Notice: Subject to any disclaimer, the term of this patent is extended or adjusted under 35 U.S.C. 154(b) by 509 days.

(21) Appl. No.: 16/503,746

(22) Filed: Jul. 5, 2019

(65) Prior Publication Data

US 2020/0030929 A1   Jan. 30, 2020

(30) Foreign Application Priority Data

Jul. 5, 2018   (DE) .................... 10 2018 116 263.4

(51) Int. Cl.
*B23Q 3/155*   (2006.01)
*B23Q 17/00*   (2006.01)
(Continued)

(52) U.S. Cl.
CPC ............ *B23Q 17/003* (2013.01); *B23B 31/10* (2013.01); *B23B 31/2012* (2021.01); *B23Q 17/005* (2013.01)

(58) Field of Classification Search
CPC ......... B23B 31/10; B23B 31/20; B23B 31/00; B23B 31/028; B23Q 17/003;
(Continued)

(56) References Cited

U.S. PATENT DOCUMENTS 4,151,642 A * 5/1979 Holland ............. B23Q 3/15546
483/8
5,035,556 A * 7/1991 Lamotte ............... G05B 19/404
700/192
(Continued)

FOREIGN PATENT DOCUMENTS

DE   69300950 T2   5/1996
DE   10025007 A1 * 11/2001 ......... B23B 31/1179
(Continued)

OTHER PUBLICATIONS

Search Report dated Mar. 4, 2019 issued in corresponding DE patent application No. 10 2018 116 263.4 (and English translation).
(Continued)

*Primary Examiner* — Joseph J Hail
*Assistant Examiner* — Arman Milanian
(74) *Attorney, Agent, or Firm* — Posz Law Group, PLC

(57) ABSTRACT

An automated tool clamping device, in particular a fully automated tool clamping device is configured for a clamping-in of at least one tool in a tool chuck by a tightening of a union nut of the tool chuck and/or for a declamping of the tool out of the tool chuck by a release of the union nut, and comprises a clamp element, which is at least configured to generate a connection, in particular a clamp connection, with the union nut of the tool chuck, and comprises a torque receiving element, which is at least configured to receive at least a large portion of a torque occurring during a tool clamping process, in particular during a tool clamping-in process and/or a tool declamping process.

21 Claims, 5 Drawing Sheets

(51) Int. Cl.
  *B23B 31/10* (2006.01)
  *B23B 31/20* (2006.01)
(58) Field of Classification Search
  CPC .. B23Q 17/0919; B23Q 17/24; B23Q 17/005;
     B23Q 3/157; B23P 11/027; Y10S 279/90
  USPC .............. 29/243, 709, 281.1, 281.5; 279/900
  See application file for complete search history.

(56) References Cited

U.S. PATENT DOCUMENTS

| | | | | |
|---|---|---|---|---|
| 5,597,964 | A * | 1/1997 | Binns | G01L 5/0042 73/761 |
| 6,755,228 | B2 * | 6/2004 | Kelch | H05B 6/42 156/499 |
| 7,278,194 | B2 * | 10/2007 | Pfau | B23P 19/10 29/721 |
| 8,739,661 | B2 * | 6/2014 | Haimer | B23B 31/20 81/176.1 |
| 2004/0005973 | A1 | 1/2004 | Momochi et al. | |
| 2006/0021208 | A1 | 2/2006 | Pfau et al. | |
| 2006/0049180 | A1 * | 3/2006 | Haimer | B23P 11/027 219/635 |
| 2010/0051610 | A1 * | 3/2010 | Wittels | B23P 11/027 29/800 |

FOREIGN PATENT DOCUMENTS

| | | | | |
|---|---|---|---|---|
| DE | 10330098 | A1 | 1/2004 | |
| DE | 102009054185 | B3 * | 4/2011 | ........... B23B 31/201 |
| EP | 0582269 | A1 | 2/1994 | |
| IT | FI20130094 | A1 * | 10/2014 | ........... B23B 31/204 |
| WO | 2004/037486 | A1 | 5/2004 | |

OTHER PUBLICATIONS

Extended European Search Report dated Mar. 18, 2020 issued in corresponding EP patent application No. 19184628.6 (and English translation).

* cited by examiner

AUTOMATED TOOL CLAMPING DEVICE, TOOL PRESETTING AND/OR TOOL MEASURING APPARATUS AND METHOD WITH AN AUTOMATED TOOL CLAMPING DEVICE

CROSS REFERENCE TO RELATED APPLICATION

This application is based on and incorporates herein by reference German Patent Application No. 10 2018 116 263.4 filed on Jul. 5, 2018.

BACKGROUND OF THE INVENTION

The invention relates to an automated tool clamping device, a tool presetting and/or tool measuring apparatus, a method with the automated tool clamping device and a method with the automated tool clamping device.

A manual tool clamping device, which is configured for a clamping-in of at least one tool in a tool chuck by a tightening of a union nut of the tool chuck, and/or for a declamping of the tool out of the tool chuck by a loosening of the union nut, has already been proposed.

The objective of the invention is, in particular, to provide a generic device with advantageous properties in regard to a clamping-in and/or declamping process of a tool into a tool chuck and/or out of a tool chuck. The objective is achieved, according to the invention, by the features of the claimed invention while advantageous implementations and further developments of the invention may be gathered from the subclaims.

BRIEF SUMMARY OF THE INVENTION

The invention concerns an automated tool clamping device, in particular a fully automated tool clamping device, which is configured for a clamping-in of at least one tool in a tool chuck by a tightening of a union nut of the tool chuck and/or for a declamping of the tool out of the tool chuck by a release of the union nut, with a clamp element, which is at least configured to generate a connection, in particular a jamming connection, with the union nut of the tool chuck, and with a torque receiving element, which is at least configured to receive at least a large portion of a torque occurring during a tool clamping process, in particular during a tool clamping-in process and/or a tool declamping process.

In this way it is in particular possible to achieve advantageous characteristics in regard to a clamping-in process and/or declamping process of a tool into a tool chuck and/or out of a tool chuck, in particular of a tool requiring, for a manipulation of the union nut in a tool clamping-in process and/or tool declamping process, a form-fit connection with the union nut and/or preferably an at least partially, in particular at least largely, form-fit jamming of a union nut. Advantageously a high degree of automation is achievable. This advantageously allows achieving a high clock rate of the tool clamping-in and/or tool declamping process, thus in particular achieving a high degree of efficiency. Moreover, a risk of maloperation is advantageously reducible. It is also advantageously possible to reduce a workload for an operator, in particular as manual work steps may be advantageously automated. By the automated tool clamping device it is furthermore advantageously possible to facilitate a presetting of a tool clamping force and/or of a tool clamping torque that is as precise as possible and/or is constant over a plurality of different tool clamping processes.

By an "automated tool clamping device" is in particular a device to be understood that is configured for an automated generation and/or an automated transfer to a tool chuck of at least one torque that is necessary for a clamping-in of the tool in the tool chuck and/or for a declamping of the tool from the tool chuck. The term "automated" is in particular to mean, in this context, machine-wise and/or independently from an operator's input, in particular independently from an operator's input with the exception of an activation, respectively deactivation of the tool clamping process by the operator and/or from an adjustment of a machine parameter of the automated tool clamping device, e.g. a target torque, by the operator. By a "fully automated tool clamping device" is in particular a device to be understood that is configured to carry out the tool clamping-in and/or tool declamping process completely independently from an operator's input, in particular with the exception of an activation, respectively deactivation of the fully automated tool clamping process by the operator and/or from an adjustment of a machine parameter of the fully automated tool clamping device. In particular, the fully automated tool clamping device is configured to perform, in an automated manner, all work steps of the tool clamping-in process and/or tool declamping process from an insertion of the tool chuck in the fully automated tool clamping device to a subsequent removal of the tool chuck from the fully automated tool clamping device, in particular at least machine-wise and/or independently from an operator's input.

"Configured" is in particular to mean specifically programmed, designed and/or equipped. By an object being configured for a certain function is in particular to be understood that the object fulfills and/or implements said certain function in at least one application state and/or operation state.

A "tool" is in particular to mean a tool with a cylindrical shaft. In particular, the tool is embodied as a milling tool. In particular, the tool is embodied as a precision tool, wherein the tool in particular has a high true-running accuracy. In particular, the tool is embodied as a reamer, as a hob-milling tool, as a chisel, as a countersink tool, and/or preferentially as a drill and/or as a milling tool. By a "tool chuck" is in particular a structural component to be understood that is configured for an accommodation of a tool and for a connection of the tool to a machine. In particular, the tool chuck is embodied as an interface between tool and machine. In particular, the tool chuck is implemented as a collet chuck. In particular, the collet chuck comprises a collet. In particular, the collet is configured for a force-fit clamping-in of the tool. In particular, the collet is tensionable by a tightening of a union nut. By a "union nut" is in particular a structural component to be understood which is configured to be at least partially screwable onto the collet of the tool chuck and/or onto a base body of the tool chuck. In particular, the union nut comprises an inner thread. In particular, the tool chuck comprises an outer thread. In particular, for a clamping-in of the tool in the tool chuck, the union nut is put over the tool that is inserted in the tool chuck and is screwed with the tool chuck until a pre-defined torque is reached. In particular, the union nut is embodied at least substantially cylindrical or prism-shaped. In particular, the union nut has a smooth cylinder surface or a smooth prism surface. In particular, the union nut comprises tool surfaces, e.g. key surfaces, edges, holes, slits or the like, which are configured to facilitate a force transfer from a tool to the union nut. Preferably, however, the union nut is embodied free of tool surfaces, e.g. key surfaces, edges, holes, slits or the like. In particular, the union nut has an outer diameter that is at least substantially equivalent to an outer diameter of the tool chuck. In particular, the union nut and/or the tool chuck is implemented to be at least substantially axially symmetrical. Preferentially, however, the union nut and/or the tool chuck are/is embodied at least substantially rotationally symmetrical. "At least substantially rotationally symmetrical" is in particular to mean rotationally symmetrical within usual error tolerances. In particular, the union nut and/or the tool chuck have/has a high true-running accuracy. By a "high true-running accuracy" is in particular a true-running accuracy to be understood which is smaller than 0.005 mm, preferentially smaller than 0.002 mm and preferably smaller than 0.001 mm.

By the torque receiving element "receiving a torque" is in particular to be understood that the torque receiving element is configured to act counter to a torque generated during the tool clamping process and is thus configured to prevent a twisting of the clamp element and/or of the union nut relative to the torque receiving element. The torque may herein in particular be generated at least partially by the clamp element and/or by the torque receiving element, while the torque is preferably generated by a unit that is realized differently and/or separately from the clamp element and/or the torque receiving element.

It is further proposed that the clamp element is configured to generate an at least largely force-fit connection with the union nut of the tool chuck. In this way, it is advantageously possible by means of the tool clamping device to enable a tool clamping process for a tool chuck that is tensioned by a union nut that is free of key surfaces, notches, holes and/or comparable tool attack surfaces and/or which has a smooth, rotationally symmetrical surface shape on an outward-facing surface. Advantageously an automated tool clamping-in and/or declamping process for tool chucks of the manufacturer Nikken, which have a cylindrical shape with a smooth surface, may be enabled. A "force-fit connection" is in particular to mean a connection in which a force, e.g. a friction force and/or a pressure force, is applied. In particular, the force-fit connection of the clamp element with the union nut of the tool chuck is at least substantially free of an additional form-fit connection. "Largely" is in particular to mean at least by 60%, preferably at least by 75%, advantageously at least by 85%, preferentially at least by 95% and especially preferentially at least by 99%.

Furthermore it is proposed that the torque receiving element comprises a torque sensor. This advantageously allows a sensing of a torque received by the torque receiving element, as a result of which it is possible to facilitate a precise control, monitoring and/or protocol of the torque during the tool clamping process. Moreover, in this way advantageously a tool-chuck-specific tensioning force in the tool clamping process is accurately pre-settable. Advantageously a high degree of accuracy of the tool clamping process is achievable. The torque sensor is in particular configured for sensing a torque at the torque receiving element. In particular, the torque sensor is implemented as an, in particular mechanical and/or electronical, preferably digital, torque pick-up. The torque pick-up in particular comprises a data exit. The data exit of the torque pick-up is in particular configured to output torque measurement data. The torque sensor is in particular configured to exchange data with a control and/or regulation unit of a tool pre-setting and/or tool measuring apparatus.

It is moreover proposed that the tool clamping device comprises at least one control and/or regulation unit, which is configured for a control and/or regulation of a course of a torque that is exerted on the union nut by the tool clamping device in the tool clamping process. In this way advantageously a high accuracy of the tool clamping process is achievable. It is also advantageously possible to run complex clamping cycles, in which a tool is, for example, pre-clamped and finally clamped with different forces and/or in which a tightening to achieve a certain torque is followed by a partial backward-turning of the union nut. A "control and/or regulation unit" is herein in particular to mean a unit with at least one controlling electronics component. By a "controlling electronics component" is in particular a unit to be understood that comprises a processor unit, a memory unit and an operation program which is stored in the memory unit. The control and/or regulation unit is in particular configured to read out data of the torque sensor and to convert these data into controlling and/or regulation orders for a control and/or regulation of a torque-generating structural component. In particular, the control and/or regulation unit is embodied integrally with the control and/or regulation unit of the tool-presetting and/or tool-measuring device and/or with a computing unit of the tool-presetting and/or tool-measuring device.

It is also proposed that the control and/or regulation unit is configured for a setting at least a maximum torque that is exerted onto the union nut by the tool clamping device, in particular by at least one torque-generating unit of the tool clamping device, in the tool clamping process. This advantageously allows achieving a high accuracy of the tool clamping process. Further a high degree of operational reliability is advantageously achievable and/or a damaging of tools and/or tool chucks due to excessive tightening of the union nut is avoidable. In particular, the control and/or regulation unit comprises at least one input module, which is configured at least for entering a tool-specific maximum torque, for example by an operator input and/or by reading tool information out of a database and/or from a tool data memory, e.g. a memory chip, a barcode and/or a data matrix code.

Beyond this it is proposed that the clamp element and the torque receiving element are implemented separately from each other. In this way a high degree of flexibility and/or compatibility is advantageously achievable, in particular by realizing the clamp element in such a way that is exchangeable. This advantageously allows using different clamp elements for different tool chucks and/or for different union nuts, in particular union nuts with different outer shapes and/or key surfaces. Moreover it is thus in particular possible to facilitate replacement of a worn-down and/or faulty clamp element, as a result of which easy maintenance can be made possible. In particular the clamp element may be loosely set onto the tool chuck and/or may be loosely removed from the tool chuck.

In particular the clamp element is implemented in such a way that it can be moved and/or set onto the tool chuck while decoupled from the torque receiving element and/or from further structural components of the tool clamping device. The term "embodied separately from each other" is in particular to mean that two objects are free of shared structural components and/or free of structural components which connect the objects directly and/or indirectly. For example, the clamp element is free of fixations connecting the clamp element in a non-releasable and/or permanent fashion to a structural component which the torque receiving element is also connected to in a non-releasable and/or permanent fashion. Preferentially the tool clamping device comprises a plurality of clamp elements. A portion of the plurality of clamp elements is herein in particular implemented to be at least substantially identical to one another. Another portion of the plurality of clamp elements is herein in particular implemented to at least substantially differ from one another, for example with different connection mechanisms, in particular different jamming mechanisms, and/or with differently shaped and/or differently dimensioned receiving spaces for contacting and/or tensioning the union nuts.

It is further proposed that the torque receiving element comprises at least one torque transfer element, which is configured to couple the torque receiving element with the clamp element in a rotationally fixed manner, in particular for the purpose of at least substantially forestalling a rotation of the clamp element in the tool clamping process. In this way advantageously an efficient torque transfer may be made possible, in particular between structural components of the tool clamping device which are embodied separately from one another. Furthermore a high degree of flexibility is thus achievable, in particular by the torque receiving element being couplable with a plurality of different clamp elements. The torque transfer element is in particular realized as at least one geometrical object, for example a protrusion and/or a recess on the torque receiving element, which is preferably configured to interact with a corresponding torque transfer element of the clamp element in such a way that a relative rotation of the torque receiving element and the clamp element is forestalled. The torque transfer element is in particular configured to permit a temporary rotationally fixed coupling between the torque receiving element and the clamp element. In particular, the torque transfer element is embodied as at least one bolt, as at least one hook and/or as at least one receptacle for a bolt and/or a hook. Alternatively or additionally it is conceivable that the torque transfer element and/or the corresponding torque transfer element of the clamp element are/is implemented as a magnetic coupling element, for example as a permanent magnet and/or as an electromagnet.

Beyond this it is proposed that the clamp element comprises a connection mechanism, in particular a jamming mechanism for establishing the, in particular force-fit, connection with the union nut, said connection mechanism being implemented to be operable like a ratchet. This advantageously allows creating the force-fit and/or form-fit connection between the clamp element and the union nut. Furthermore, in particular due to the ratchet-like operability, advantageously a high degree of operational flexibility is achievable, in particular as a tightening of the union nut may also be realized by rotations without requiring full rotation of the clamp element by 360 degrees. In particular, the clamp element comprises a jamming region that is configured to at least partly encompass the union nut in a circumferential direction. In particular the clamp element comprises a plurality of jamming elements. In particular the jamming elements are arranged in a circumferential direction of the jamming region. The jamming elements are in particular configured for a generation of the force-fit connection with the union nut.

In particular the jamming elements are configured to fixedly jam the union nut in the jamming region by reducing the jamming region, in particular the circumference of the jamming region. Alternatively the clamp element may comprise at least one union nut contact region, which is implemented corresponding to at least one tool surface of a union nut and is in particular configured to realize, for a transfer of a torque between union nut and clamp element, an engagement with the tool surfaces of the union nut. By the term "operable like a ratchet" is in particular to be understood that the connection mechanism, in particular the jamming mechanism, is operable like a socket wrench and/or a ratchet, wherein in particular the union nut connected by the connection mechanism, in particular jammed by the jamming mechanism, is connected with the clamp element in a rotation direction around a symmetry axis of the union nut in a rotationally fixed manner, and wherein the union nut connected by the connection mechanism, in particular jammed by the jamming mechanism, is substantially freely rotatable in a rotation direction counter to the rotation direction. In particular the union nut connected in the clamp element by the connection mechanism, in particular jammed in the clamp element by the jamming mechanism, is "rotatable like a ratchet". In particular the union nut connected in the clamp element by means of the ratchet-like operable connection mechanism, in particular jammed in the clamp element by means of the ratchet-like operable jamming mechanism, is connected with the clamp element in such a way that a torque transfer between the clamp element and the union nut can be effected in a rotation direction around the symmetry axis of the union nut, whereas the clamp element remains at least partially freely rotatable around the union nut in the opposite rotation direction.

It is also proposed that the clamp element comprises a switch element, which is configured to allow a switching between two opposite rotational tension directions of the ratchet-like operable connection mechanism, in particular jamming mechanism. This advantageously allows reaching a high degree of flexibility of the clamp element, in particular as a clamping-in and a declamping of a tool from a tool chuck can be realized with the same clamp element. Alternatively it is however conceivable that different clamp elements are configured for a clamping-in process and for a declamping process of a tool. It is moreover advantageously possible to adapt a direction of the torque to a direction of a thread of the tool chuck and/or of the union nut. Advantageously the tool clamping device is usable for tool chucks with different thread directions. In particular the switch element is implemented as a switch lever, as a switch button, as a switch slider, or the like. In particular the switch element is configured to determine the rotational tensioning direction. By a "rotational tensioning direction" is in particular a rotation direction to be understood in which a torque transfer between the clamp element and the union nut is enabled by a force-fit connection via the jamming mechanism and/or via a form-fit connection of the connection mechanism.

Furthermore it is proposed that the torque receiving element comprises an actuation element, which is configured to actuate at least the switch element, in particular in an automated manner. In this way advantageously a high degree of flexibility of the torque receiving element is achievable. Moreover, it is advantageously possible to facilitate an automated switching of the ratchet-like operable connection mechanism, in particular jamming mechanism. In particular, the actuation element is embodied as a mechanically and/or electrically switchable and/or operable actuator.

It is further proposed that the tool clamping device comprises at least one torque generating unit, which is implemented separately from the clamp element and/or from the torque receiving element and which is configured to generate a torque that is required for the tool clamping process. In this way it is advantageously possible to facilitate a generation of a torque for the tool clamping process that is decoupled from the clamp element and/or from the torque receiving element. This advantageously allows increasing an intensity and/or a precision of the generated torque. The torque generating unit is in particular implemented as an electro-motoric rotational drive or the like. Alternatively or additionally the torque generating unit may comprise a pneumatic and/or a hydraulic rotational drive. In particular, the torque generating unit is configured to be capable of rotating the tool chuck by at least 360 degrees in one contiguous rotation step. In particular the torque generating unit is embodied at least partially in a one-part implementation with a rotational drive, in particular a CNC-controlled C-axis, of a tool presetting and/or tool measuring apparatus, which is also usable for a tool presetting and/or tool measuring process of the tool presetting and/or tool measuring apparatus. By two units, in particular two drives, being embodied "partially in a one-part implementation" is in particular to be understood that the units, in particular the drives, comprise at least one, in particular at least two, advantageously at least three shared elements which are part, in particular a functionally relevant part, of both units.

Beyond this it is proposed that the tool clamping device comprises at least one further torque generating unit, which is embodied separately from the torque generating unit. In this way advantageously a high precision and/or an especially wide range of pre-settable torques are/is achievable, in particular by the different torque generating units having different work areas and/or accuracies. The further torque generating unit in particular comprises a hydraulic and/or pneumatic drive. Alternatively or additionally the torque generating unit may comprise an electro-motoric rotational drive. In particular, the further torque generating unit is configured, in a rotation of the tool chuck by a rotation angle of more than 360 degrees, to rotate the tool chuck in a plurality of discrete rotation steps, the respective rotation steps comprising rotation angles smaller than 360 degrees. In particular, the further torque generating unit is implemented separately from a rotational drive, in particular a C-axis, of a tool presetting and/or tool measuring apparatus, which is also usable for a tool presetting and/or tool measuring process of the tool presetting and/or tool measuring apparatus.

Furthermore it is proposed that the torque generating unit is configured for a pre-tensioning of the union nut and that the further torque generating unit is configured for a main tensioning of the union nut. This advantageously allows an optimization of the tool clamping process. In particular a high accuracy is achievable. By a "pre-tensioning of the union nut" is in particular a tensioning of the union nut to be understood in which a tensioning force and/or a torque is only a fraction of a maximum tensioning force and/or of a maximum torque. In particular, the tensioning force and/or the tensioning torque are/is in the pre-tensioning at least 5%, preferably maximally 10%, advantageously maximally 15%, preferentially maximally 20% and particularly preferably maximally 30% of the maximum tensioning force and/or of the maximum torque. By a "main tensioning" is in particular a tensioning to be understood in which the union nut is tightened with a predetermined maximum tensioning force and/or a predetermined maximum torque. In particular, the further torque generating unit is configured for a loosening of the maximum tensioning force in a declamping process. In particular, the torque generating unit is configured, in the declamping process, to realize a complete release of the union nut from the tool chuck subsequently to the loosening of the maximum tensioning force.

It is further proposed that the further torque generating unit comprises a stroke element, in particular a pneumatic stroke element or a hydraulic stroke element, for generating a linear stroke. In this way advantageously a major torque is achievable. In particular the further torque generating unit comprises a cam mechanism, which is configured to convert a linear movement, in particular the linear stroke, of the stroke element, in particular the pneumatic stroke element or the hydraulic stroke element, into a rotary movement. In particular, the further torque generating unit is configured to generate a rotary movement of a clamp element of the tool clamping device, which is intended for the main tensioning of the union nut.

If the tool clamping device comprises at least one adjustment unit, which is configured to traverse the further torque generating unit in at least one spatial direction, in particular at least one horizontal direction, a high degree of flexibilty is advantageously achievable. In particular, the further torque generating unit is, as a result, rotationally couplable with and/or decouplable from the tool chuck and/or the union nut. Alternatively or additionally it is conceivable that the further torque generating unit is pivotable and/or traversable in at least one, preferentially two further spatial directions. In particular the adjustment unit comprises at least one linear motor, which is at least configured to traverse the further torque generating unit.

If the tool clamping device further comprises at least one vertical adjustment unit, which is at least configured to permit a vertical traversing of the torque receiving element, it is advantageously possible to facilitate an automated coupling between the clamp element and the torque receiving element. This advantageously enables a control, in particular activation and/or deactivation, of a torque transfer onto the union nut. Moreover a high degree of flexibility is advantageously achievable, in particular as a position of the torque receiving element may be adaptable to a size of a tool chuck. In particular, the vertical adjustment unit comprises a linear motor or the like, which is at least configured to effect a continuous translation of the torque receiving element in a vertical direction.

Furthermore a tool presetting and/or tool measuring apparatus is proposed, which is configured at least for a presetting and/or a, preferably optical, measuring of a tool clamped in a tool chuck, with an automated, in particular fully automated, tool clamping device and with an attachment holder, which is at least configured for an accommodation, in particular a rotationally fixed accommodation, of a tool chuck. This advantageously allows carrying out a presetting and/or measuring process of a tool in the corresponding tool chuck with the union nut directly during the tool clamping-in and/or tool declamping process and/or subsequently to the tool clamping-in and/or tool declamping process, as a result of which in particular a high efficiency and/or a high accuracy are/is achievable. Advantageously the functions of two separate apparatuses, a tool clamping device for respectively embodied tool chucks and of the tool presetting and/or tool measuring apparatus, may be combined in a single apparatus. In particular, the attachment holder is implemented as an adapter, which is configured to hold and/or to position the tool chuck relative to the tool presetting and/or tool measuring apparatus, in particular relative to a rotatable spindle unit of the tool presetting and/or tool measuring apparatus. In particular the attachment holder is connected to the spindle unit in a rotationally fixed manner. In particular the attachment holder comprises a receptacle that is adapted to at least one outer shape of a tool chuck. In particular, the attachment holder is implemented in such a way that it is easily exchangeable. It is conceivable that the tool presetting and/or tool measuring apparatus comprises a plurality of attachment holders for different outer shapes of tool chucks. In particular the tool chuck is held in the attachment holder in such a way that it is rotationally fixed relative to the attachment holder. In particular the attachment holder is configured to transfer a torque generated by means of the torque generating unit and/or by means of the further torque generating unit at least to the tool chuck.

It is also proposed that the attachment holder comprises at least one coupling unit, which is configured for a rotationally fixed coupling of the attachment holder with at least one of the torque generating units of the tool clamping device, in particular the torque generating unit and/or the further torque generating unit of the tool clamping device. In this way an advantageous transfer of a torque onto the tool chuck and/or the union nut may be made possible. In particular, the attachment holder comprises at least one further coupling unit, which is configured for a rotationally fixed coupling with the further torque generating unit of the tool clamping device. In particular, the coupling unit is configured for an operationally releasable coupling of the further torque generating unit and the attachment holder. "Operationally releasable" is in particular to mean releasable, in an automated manner, during automated operation. In particular, the further torque generating unit comprises a corresponding coupling unit. Preferentially a coupling between the further torque generating unit and the attachment holder is effected via a coupling, preferably an engagement, of the coupling unit and the corresponding coupling unit. In particular, the corresponding coupling unit is embodied to be shaped like an open-end wrench or jaw wrench. This advantageously allows achieving a coupling of the further torque generating unit with the attachment holder just by a simple linear traversing of the further torque generating unit, which results in an at least partial engagement of the corresponding coupling unit around the coupling unit. In particular the coupling unit is embodied to be shaped like a drive profile of a screw, which in particular has at least two key surfaces extending at least substantially parallel to one another on an outer wall, in particular an outer surface, of the attachment holder. By two objects which are embodied "rotationally fixed" relative to one another are in particular two objects to be understood which are free of rotation possibilities relative to one another. In particular, rotationally fixed objects are connected to one another in such a way that exclusively a rotation of the objects together is possible.

In addition it is proposed that the tool presetting and/or tool measuring apparatus comprises an angle sensor unit, which is in particular configured to sense a rotation angle, a rotation direction and/or a rotation speed of the attachment holder. This advantageously allows facilitating a precise control and/or regulation of a tightening and/or releasing of the union nut. The angle sensor unit is in particular implemented as an optical angle sensor unit, e.g. using a laser and/or a camera, as a mechanical angle sensor unit, e.g. using a measuring wheel and/or a measuring spring, as an electrical angle sensor unit, e.g. using an electrical contact current, and/or as a magnetic angle sensor unit, e.g. using an induction voltage.

It is further proposed that the tool presetting and/or tool measuring apparatus comprises a handling robot, which is at least configured, in an automated manner, to set a clamp element of the tool clamping device upon a tool chuck and/or remove a clamp element from a tool chuck. In this way it is advantageously possible to further a full automation of the tool clamping process. As a result, a workload for an operator as well as a risk of maloperation may advantageously be reduced. The handling robot is in particular embodied as a multi-axial industry robot. The handling robot in particular comprises at least one gripper unit, which is at least configured to receive and/or to hold at least one clamp element. The handling robot is in particular configured to identify and to localize a clamp element suitable for a tool chuck that is clamped in the attachment holder. The gripper unit is in particular configured to receive the clamp element and to transport it to a tool chuck. The gripper unit is in particular configured to set the clamp element onto the tool chuck. The gripper unit is in particular configured to remove the clamp element from the tool chuck subsequently to the tool clamping process. The clamp element comprises at least one holder element, which is at least configured to realize an attack surface for the gripper unit of the handling robot. The holder element is in particular embodied as a gripper groove.

Furthermore a method with an automated tool clamping device, in particular a fully automated tool clamping device, is proposed, wherein a tool is clamped into a tool chuck by a tightening of a union nut of the tool chuck, and/or is declamped from the tool chuck by a release of the union nut from the tool chuck, wherein a clamp element of the tool clamping device is connected, in particular jammed, with the union nut of the tool chuck by an, in particular at least largely, force-fit connection, in particular jamming connection, and/or by a form-fit connection, and wherein a torque occurring during a tool clamping process, in particular during a tool clamping-in and/or tool declamping process, is received at least to a large extent by a torque receiving element of the tool clamping device. This in particular allows achieving advantageous characteristics regarding a clamping-in and/or declamping process of a tool into a tool chuck and/or from a tool chuck, in particular a tool requiring, for a manipulation of the union nut in a tool clamping-in and/or tool declamping process, a form-fit connection with the union nut and/or preferably an, at least partially, in particular at least largely, force-fit jamming of the union nut. Advantageously a high degree of automatization is achievable.

Beyond this a method is proposed for an automated, in particular fully automated, clamping-in of a tool in a tool chuck comprising a union nut by means of the tool clamping device, wherein in at least one clamping-in step the union nut of the tool chuck is tightened to a first limit torque, and wherein in at least one further clamping-in step, which in particular temporally follows the clamping-in step, the union nut of the tool chuck is tightened to a second limit torque, wherein a torque for a tightening of the union nut in the two clamping-in steps is generated by torque generating units which are embodied separately from one another and are operated in an automated manner. This advantageously allows achieving a high precision of the clamping-in process. Furthermore a wide range of possible torques is achievable in this way. As a result of this, it is moreover advantageously possible to achieve a high velocity of the clamping-in process, in particular if, in the clamping-in step, first all a quick, rough fastening of the tool chuck is effected by the torque generating unit and, in the further clamping-in step, a slower, accurate tightening to the second torque is effected. This also advantageously allows achieving large tightening momentums of union nuts. In particular, the first limit torque is below approximately 25 Nm, preferably below approximately 17 Nm, advantageously below approximately 12 Nm, preferentially below approximately 7 Nm and particularly preferably above approximately 3 Nm. In particular the second limit torque is at least 40 Nm, preferably at least 50 Nm, advantageously at least 60 Nm, preferentially at least 70 Nm and particularly preferably no more than 80 Nm. In particular, between the clamping-in step and the further clamping-in step a tool plugged in the tool chuck is preset to length by the tool presetting and/or tool measuring apparatus in an automated, in particular fully automated manner. In this way a light holding created by the first limit torque may advantageously be used for securing the tool against slipping while maintaining a length presettability. Subsequently to the presetting of the length of the tool, the tool is then firmly fixated in the tool chuck by tightening until the second limit torque is reached. This advantageously allows enabling an optimized combined tool clamping-in, tool measuring and tool clamping.

It is also proposed that at least the first limit torque and/or at least the second limit torque are/is predetermined and/or monitored by a control and/or regulation unit of the tool clamping device. In this way a high degree of automatization and/or a high operational reliability are/is advantageously achievable.

Furthermore it is proposed that the second limit torque is many times greater than the first limit torque, in particular at least three times, preferably five times, advantageously seven times, preferentially ten times and especially preferentially twenty times greater. This advantageously allows achieving a particularly high tightening momentum of the union nut, as a result of which advantageously a wide range of tool chucks can be tensioned.

Beyond this a method for an automated, in particular fully automated, declamping of a tool from a tool chuck comprising a union nut by a tool clamping device is proposed, wherein in at least one declamping step the union nut of the tool chuck is unwound, in an automated manner, by a first number of rotations by means of a further torque generating unit of the tool clamping device, and wherein in at least one further declamping step, which in particular temporally follows the declamping step, the union nut of the tool chuck is unwound, in an automated manner, by a second number of rotations by a torque generating unit of the tool clamping device that is embodied separately from the further torque generating unit, and wherein the total number of rotations is sensed by the torque generating unit and/or by an angle sensor unit of the tool clamping device. In this way a high degree of accuracy is advantageously achievable. It is advantageously possible to prevent an overwinding of the union nut in a declamping process, and damages to a thread of the union nut or to a thread of the tool chuck are thus advantageously avoidable. Moreover, in particular by a sensing of the total number of rotations, an automatization of the tool declamping process may advantageously be improved, in particular as it is possible to make sure that, in a removal, in particular a removal by the handling robot, of the clamp element from the tool chuck, the union nut, which is still jammed with the clamp element after a tool declamping process, is no longer connected with the tool chuck, as a result of which a damaging of the automated tool clamping device is advantageously avoidable.

It is further proposed that, if a release torque is not reached, the declamping step, in particular a torque generation of the further torque generating unit, is terminated and the further declamping step, in particular a torque generation of the torque generating unit, is started. This advantageously allows enabling a particularly effective tool declamping process. Advantageously it is also possible to ensure the torque generating units being preferably used in their respective optimum rotation speed ranges. In this way a long lifetime of the tool clamping device is advantageously achievable.

Furthermore it is proposed that the further declamping step, in particular a torque generation of the torque generating unit, is stopped as soon as a limit value of a total number of rotations of the union nut is exceeded, wherein in particular the total number of rotations is calculated by an addition of the sensed first number of rotations and the sensed second number of rotations. This advantageously allows achieving a high degree of accuracy. It is advantageously possible to prevent an overwinding of the union nut in a declamping process, thus advantageously avoiding damages to a thread of the union nut or to a thread of the tool chuck.

Moreover, in particular by a sensing of the total number of rotations, an automatization of the tool declamping process may advantageously be improved. In particular, the limit value of the total number of rotations is equivalent to a number of rotations that is at least greater, preferably greater at least by the FIG. 1 and preferentially greater by no more than the FIG. 5, than the total number of windings of the inner thread of the union nut. Alternatively or additionally it is conceivable that a number of rotations in a clamping-in process of a tool in a tool chuck is recorded by the angle sensor unit, is saved in a data carrier and is in a declamping process predetermined as the limit value of the total number of rotations, in particular as the before-mentioned number of rotations.

The automated tool clamping device according to the invention, the tool presetting and/or tool measuring apparatus according to the invention and the methods according to the invention are herein not to be limited to the application and implementation described above. In particular, to fulfill a functionality that is described here, the automated tool clamping device according to the invention, the tool presetting and/or tool measuring apparatus according to the invention and the methods according to the invention may comprise a number of individual elements, structural components, units and method steps that differs from a respective number that is mentioned here.

BRIEF DESCRIPTION OF THE SEVERAL VIEWS OF THE DRAWINGS

Further advantages will become apparent from the following description of the drawings. The drawings show two exemplary embodiments of the invention. The drawings, the description and the claims contain a plurality of features in combination. Someone skilled in the art will purposefully also consider the features separately and will find further expedient combinations.

It is shown in.

DETAILED DESCRIPTION OF THE INVENTION

Figure 1:
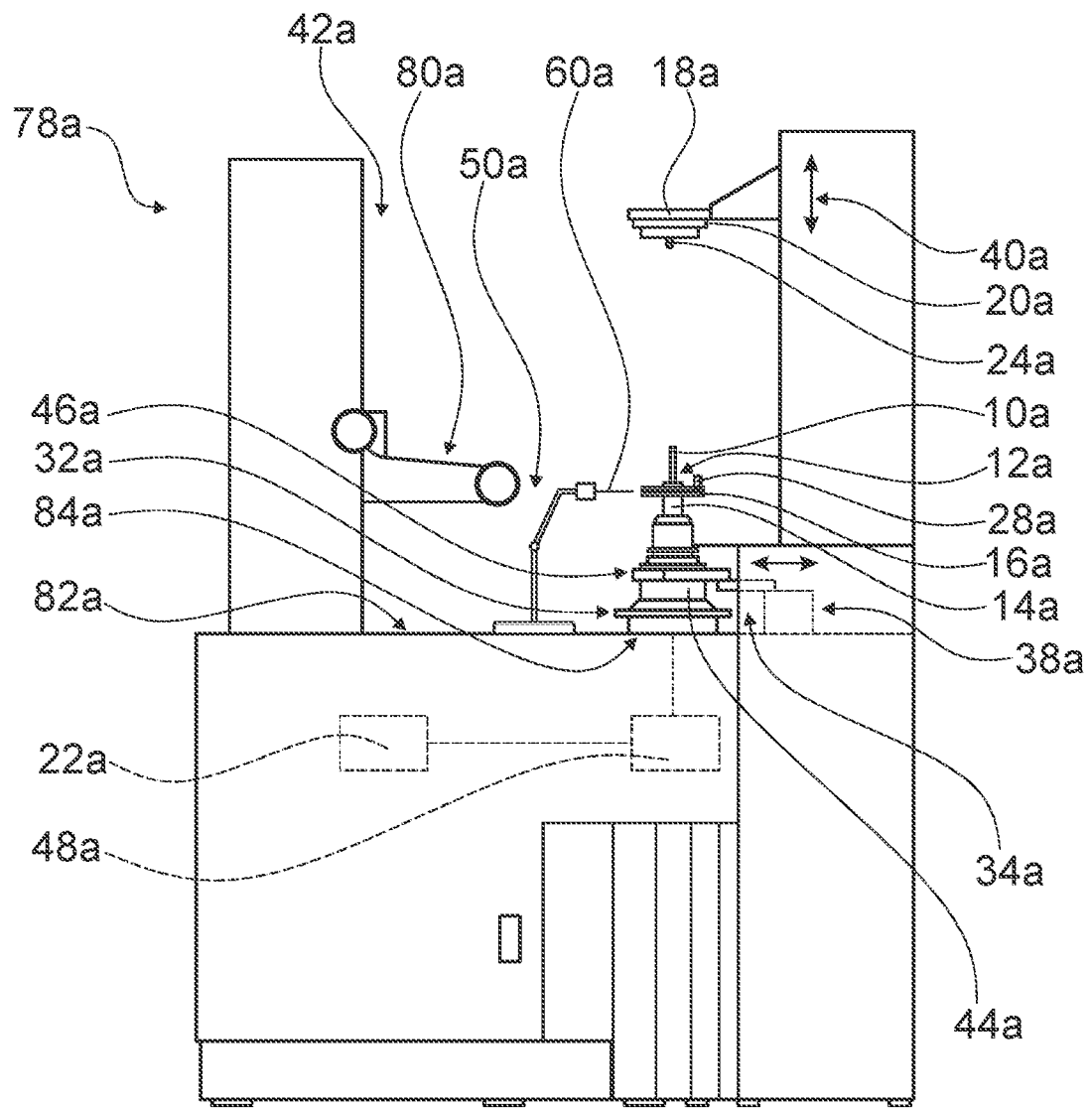
FIG. 1 a schematic representation of a tool presetting and/or measuring apparatus with an automated tool clamping device and a tool chuck, FIG. 2 a schematic perspective view of the tool chuck, FIG. 3 a schematic perspective view of a clamp element of the automated tool clamping device, FIG. 4 a schematic perspective view of a torque receiving element of the automated clamping device, FIG. 5 a schematic perspective view of the tool chuck clamped in an attachment holder of the tool presetting and/or tool measuring apparatus, FIG. 6 a schematic representation of a further torque generating unit of the automated tool clamping device, FIG. 7 a schematic flow chart of a method with the automated tool clamping device, and FIG. 8 a schematic perspective view of an alternative clamp element of the automated tool clamping device.
Figure 2:
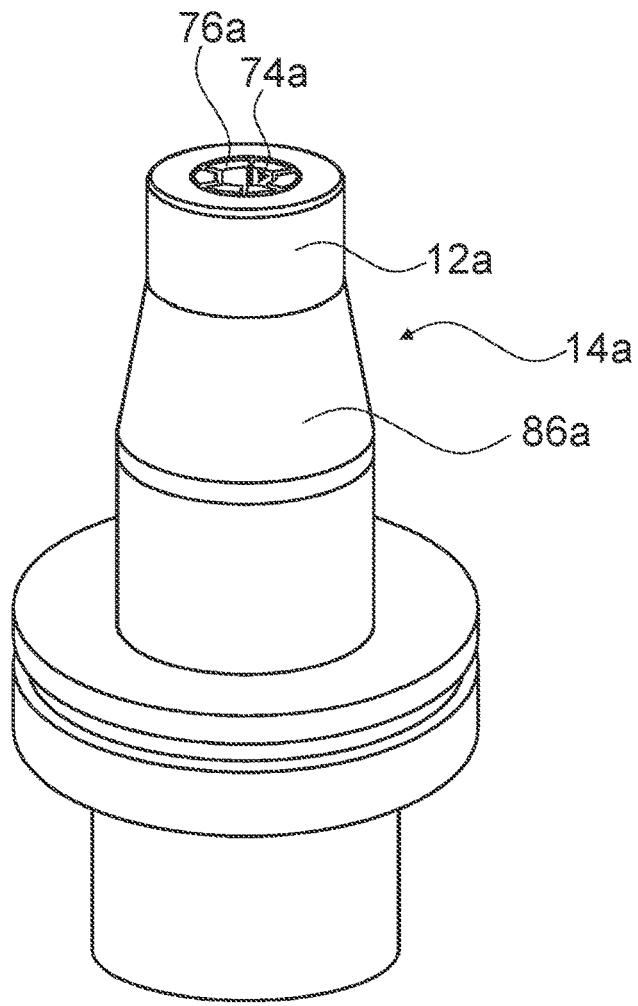

FIG. 1 shows a tool presetting and/or tool measuring apparatus 42a, which is configured at least for a presetting and/or for a, preferably optical, measuring of a tool 10a that is clamped in a tool chuck 14a. The tool chuck 14a is implemented as a collet chuck (cf. also FIG. 2). The tool chuck 14a comprises a union nut 12a. The tool chuck 14a comprises a base body 86a. The union nut 12a is implemented in such a way that it is screwable onto the base body 86a. The tool chuck 14a comprises a tool receptacle 74a. The tool receptacle 74a is configured for a plugging-in and/or an accommodation of a tool shaft of a tool 10a. The tool chuck 14a comprises a collet 76a. The collet 76a is arranged in the tool receptacle 74a of the tool chuck 14a. The union nut 12a is configured to be guided over a tool 10a that is plugged in the tool receptacle 74a and to be screwed with the base body 86a of the tool chuck 14a. The collet 76a is configured to fixate a tool 10a in the tool receptacle 74a by a screwing-on of the union nut 12a.

The tool presetting and/or tool measuring apparatus 42a comprises a measuring tower 78a. The measuring tower 78a comprises an optical measuring device 80a. The optical measuring device 80a is configured for a measurement and/or presetting of the tool 10a that is clamped in the tool chuck 14a, in particular of at least one cutter of the tool 10a that is clamped in the tool chuck 14a. The optical measuring device 80a is embodied as a transmitted-light measuring device. Alternatively or additionally the tool presetting and/or tool measuring apparatus 42a may comprise an incident-light measuring device. The optical measuring device 80a is traversable vertically along the measuring tower 78a. The tool presetting and/or tool measuring apparatus 42a comprises a measuring table 82a. The measuring tower 78a is embodied to be traversable horizontally along the measuring table 82a. The optical measuring device 80a is embodied to be traversable horizontally along the measuring table 82a. The tool presetting and/or tool measuring apparatus 42a comprises a control and/or regulation unit 22a. The control and/or regulation unit 22a is at least configured for a control and/or regulation of the movement and/or the function of the measuring tower 78a and/or of the optical measuring device 80a. The control and/or regulation unit 22a comprises at least one computing unit.

The tool presetting and/or tool measuring apparatus 42a comprises an attachment holder 44a. The attachment holder 44a is configured for a rotationally fixed accommodation of a tool chuck 14a. The attachment holder 44a is adapted to an outer shape of the tool chuck 14a. The tool presetting and/or tool measuring apparatus 42a comprises a plurality of differently shaped attachment holders 44a, which are adapted to a variety of outer shapes of different tool chucks 14a. The attachment holder 44a is implemented to be exchangeable. The tool presetting and/or tool measuring apparatus 42a comprises a spindle unit 84a. The spindle unit 84a is configured for a rotationally fixed coupling with an attachment holder 44a. The spindle unit 84a is fixedly connected with the tool presetting and/or tool measuring apparatus 42a. The spindle unit 84a is implemented to be rotatable. The attachment holder 44a comprises a coupling unit 46a (cf. also FIG. 5). The coupling unit 46a is configured for a rotationally fixed coupling of the attachment holder 44a with a torque generating unit 34a of an automated tool clamping device.

The tool presetting and/or tool measuring apparatus 42a comprises an angle sensor unit 48a. The angle sensor unit 48a is configured to sense a rotation angle, a rotation direction and/or a rotation speed of the attachment holder 44a relative to the measuring table 82a of the tool presetting and/or tool measuring apparatus 42a. The angle sensor unit 48a is partially embodied integrally with the control and/or regulation unit 22a. Alternatively or additionally the angle sensor unit 48a is configured to transmit at least angle measuring data and/or angle speed measuring data to the control and/or regulation unit 22a, and/or to receive and/or process at least control and/or regulation orders from the control and/or regulation unit 22a.

The tool presetting and/or tool measuring apparatus 42a comprises a handling robot 50a. The handling robot 50a is configured for, in an automated manner, setting a clamp element 16a of the automated tool clamping device upon a tool chuck 14a and/or removing such a clamp element 16a from a tool chuck 14a. The handling robot 50a is embodied as a multi-axial industry robot. The handling robot 50a comprises a gripper unit 60a. The gripper unit 60a is configured for gripping, picking up and/or laying down clamp elements 16a.

The tool presetting and/or tool measuring apparatus 42a comprises an automated tool clamping device. The tool clamping device is fully automated. The tool clamping device is configured for a clamping-in of at least one tool 10a in a tool chuck 14a by tightening a union nut 12a of the tool chuck 14a and/or for a declamping of the tool 10a out of the tool chuck 14 by a release of the union nut 12a. The tool clamping device comprises a control and/or regulation unit 22a. The control and/or regulation unit 22a of the tool clamping device is embodied at least partly integrally with the control and/or regulation unit 22a of the tool presetting and/or tool measuring apparatus 42a.

Figure 3:
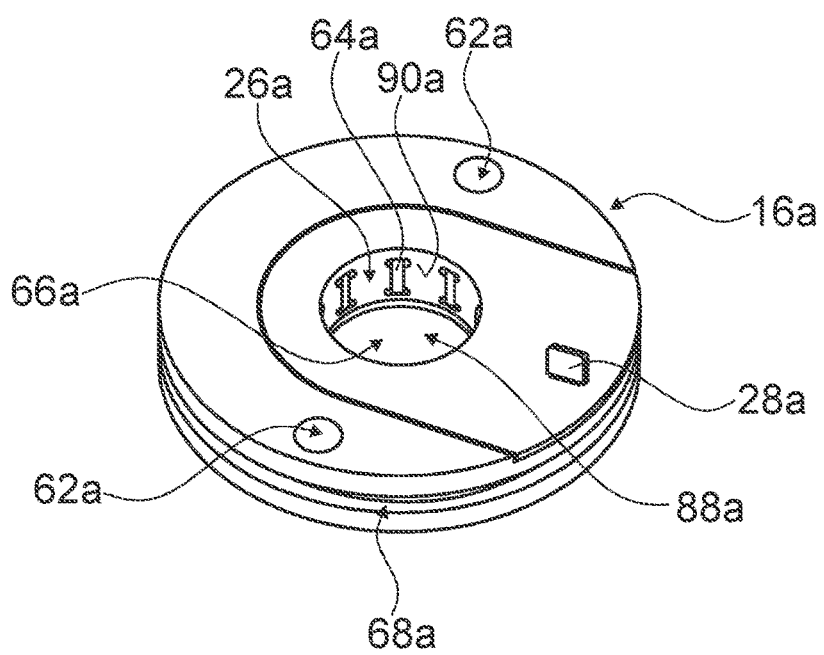

The tool clamping device comprises a clamp element 16a (cf. also FIG. 3). The clamp element 16a is embodied to be loosely settable onto the tool chuck 14a. The clamp element 16a is embodied to be loosely removable from the tool chuck 14a. The clamp element 16a is configured to generate a connection with the union nut 12a of the tool chuck 14a. The clamp element 16a comprises a connection mechanism 26a. The connection mechanism 26a is configured for establishing the connection to the union nut 12a. The connection of the clamp element 16a with the union nut 12a is implemented as a jamming connection. The connection mechanism 26a of the clamp element 16a is implemented as a jamming mechanism. The connection mechanism 26a of the clamp element 16a shown in FIG. 3, which is implemented as a jamming mechanism, is configured to generate a largely force-fit connection with the union nut 12a of the tool chuck 14a.

The clamp element 16a shown in FIG. 3 comprises a jamming region 66a. The jamming region 66a is configured to accommodate a union nut 12a. The jamming region 66a is configured to encompass a union nut 12a. The jamming region 66a forms a recess 88a in the clamp element 16a. The recess 88a of the clamp element 16a has a shape that corresponds to an outer shape of the union nut 12a. The clamp element 16a comprises a plurality of jamming elements 64a. The jamming elements 64a are arranged in such a way that they are distributed along a wall 90a of the recess 88a of the clamp element 16a. The jamming elements 64a are configured for jamming the union nut 12a in the jamming region 66a. The jamming elements 64a are configured for jamming a cylinder-shaped union nut 12a that is implemented free of tool surfaces.

The connection mechanism 26a is embodied to be operable in a ratchet-like manner. In a state when the clamp element 16a is connected with a tool 10a, the clamp element 16a is rotatable, by means of the ratchet-like operable connection mechanism 26a, partially around the tool 10a around a rotation axis extending in parallel to a plug-in direction of the tool 10a in the jamming region 66a, whereas, in a tensioning-rotation direction that is opposite to the rotation direction, it is rotatable only together with the tool 10a. A rotation of the clamp element 16a in the tensioning-rotation direction is configured for a tightening and/or a release of a union nut 12a. However, a rotation of the clamp element 16a in the rotation direction that is opposite to the tensioning-rotation direction does not result in a tightening and/or a release of the union nut 12a. The tensioning-rotation direction is selectable. The clamp element 16a comprises a switch element 28a, which is configured to enable a switching between two opposite tensioning-rotation directions of the ratchet-like operable connection mechanism 26a.

The clamp element 16a comprises a holder element 68a. The holder element 68a is implemented as a gripper groove. The holder element 68a is configured to form an attack surface for the gripper unit 60a of the handling robot 50a. The gripper unit 60a of the handling robot 50a is configured, for picking up the clamp element 16a by means of fork-shaped gripper elements of the gripper unit 60a, to engage in the holder element 68a in a form-fit manner. The clamp element 16a comprises corresponding torque transfer elements 62a. The corresponding torque transfer elements 62a are configured for a coupling with torque transfer elements 24a of a torque receiving element 18a.

Figure 4:
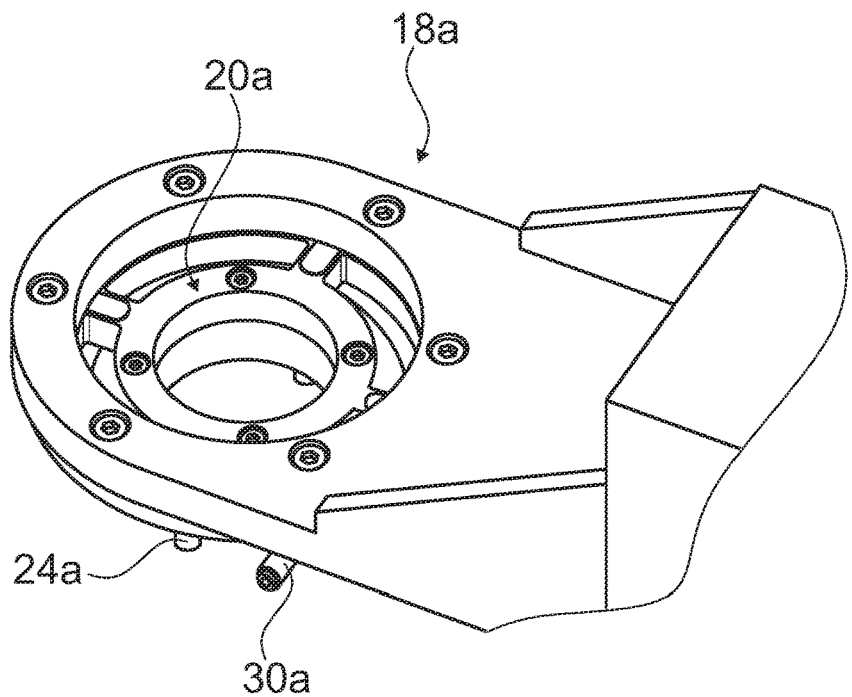

The tool clamping device comprises the torque receiving element 18a (cf. also FIG. 4). The torque receiving element 18a is configured to receive a large portion of a torque occurring during a tool clamping process. The torque receiving element 18a and the clamp element 16a are embodied separately from each other. The torque receiving element 18a comprises the torque transfer element 24a. The torque transfer element 24a of the torque receiving element 18a is configured for a rotationally fixed coupling of the torque receiving element 18a with the clamp element 16a. The torque transfer element 24a of the torque receiving element 18a and the corresponding torque transfer element 62a of the clamp element 16a engage in one another for a coupling of the clamp element 16a with the torque receiving element 18a. The torque transfer element 24a is embodied as a pin. The corresponding torque transfer element 62a is embodied as a recess.

The tool clamping device comprises a vertical adjustment unit 40a. The vertical adjustment unit 40a is configured to permit a vertical traversing of the torque receiving element 18a. By the vertical traversing of the torque receiving element 18a it is possible to establish a coupling of the torque transfer elements 24a, 62a. A vertical lowering of the torque receiving element 18a towards a clamp element 16a that is set on a tool chuck 14a results in an engagement of the torque transfer element 24a of the torque receiving element 18a into the corresponding torque transfer element 62a of the clamp element 16a. At least the position and/or at least the traversing velocity of the vertical adjustment unit 40a are/is adjustable via the control and/or regulation unit 22a. It is for example conceivable that position data and/or dimension data captured by the optical measuring device 80a are processed by the control and/or regulation unit 22a and are converted into control orders for the vertical adjustment unit 40a. This advantageously allows facilitating a precise and/or damage-free coupling of the torque transfer elements 24a, 62a. In particular it is conceivable that the optical measuring device 80a is configured to identify faultily positioned clamp elements 16a, e.g. clamp elements 16a lying upon the tool chuck 14a in a twisted and/or oblique fashion, and consequently to prevent a lowering of the torque receiving element 18a and/or a coupling of the torque transfer elements 24a, 62a with one another. In this way malfunctioning and/or damaging of the tool clamping device are advantageously avoidable.

The torque receiving element 18a comprises an actuation element 30a. The actuation element 30a is configured for an actuation of the switch element 28a of the clamp element 16a. The actuation element 30a comprises a pneumatic cylinder that is configured to generate a movement at least of a portion of the actuation element 30a, which movement is configured for a mechanic actuation of the switch element 28a.

The torque receiving element 18a comprises a torque sensor 20a. The torque sensor 20a is configured to sense a torque applied at the torque receiving element 18a. The torque sensor 20a is realized as a torque-measuring flange. The torque sensor 20a comprises a torque pick-up. The torque pick-up is embodied as a spring gauge. Alternatively or additionally the torque pick-up may work according to a piezoelectric, magneto-elastic and/or optical principle. The control and/or regulation unit 22a is configured to read out and/or receive data of the torque sensor 20a. The control and/or regulation unit 22a is configured for a control and/or regulation of a course of a torque that is exerted onto the union nut 12a by the tool clamping device in the tool clamping process. The control and/or regulation unit 22a is configured for a presetting of a maximum torque exerted onto the union nut 12a by the tool clamping device in the tool clamping process.

Figure 5:
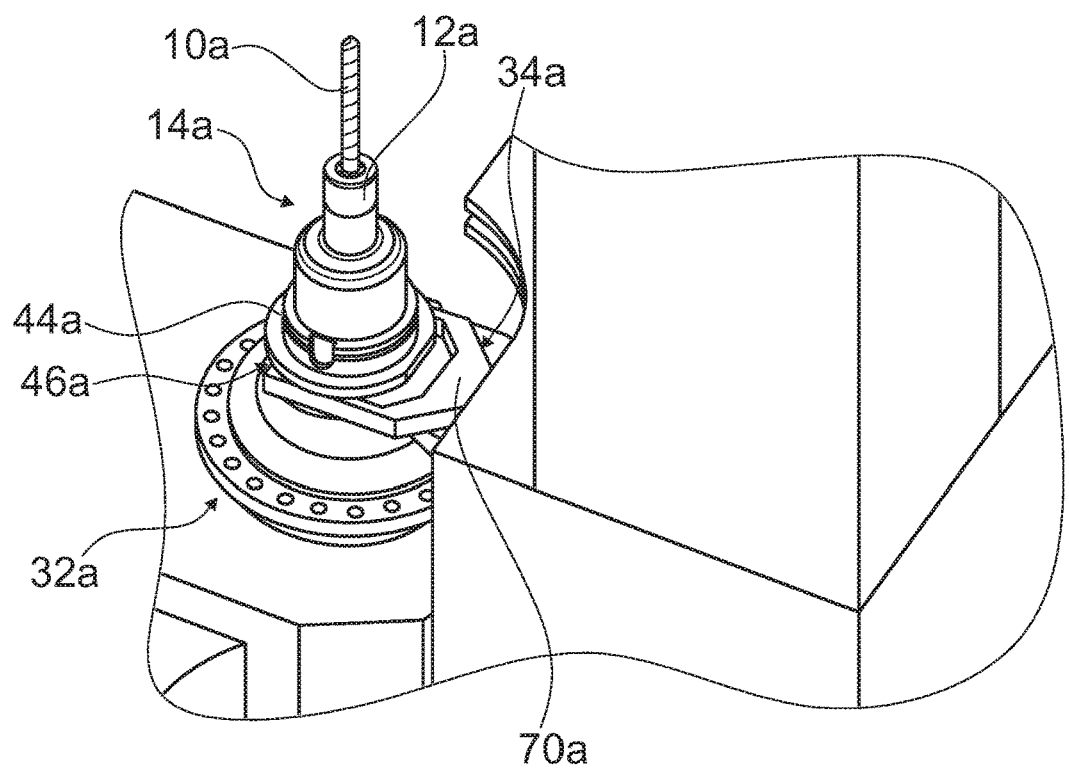

The tool clamping device comprises a torque generating unit 32a (cf. FIG. 1 or FIG. 5). The torque generating unit 32a is embodied separately from the clamp element 16a and/or separately from the torque receiving element 18a. The torque generating unit 32a is configured to generate a torque that is necessary for the tool clamping process. The torque generating unit 32a is embodied at least partly integrally with the spindle unit 84a of the tool presetting and/or tool measuring apparatus 42a. The torque generating unit 32a is embodied at least partly with a unit of the tool presetting and/or tool measuring apparatus 42a which is configured for a positioning of the tool 10a during a measuring and/or presetting process of the tool presetting and/or tool measuring apparatus 42a, for example by means of the optical measuring device 80a. The torque generating unit 32a is configured for a pre-tensioning of the union nut 12a during a tool clamping-in process. The torque generating unit 32a, in particular the torque generated by the torque generating unit 32a and/or the rotation generated by the torque generating unit 32a, is controllable via the control and/or regulation unit 22a. A control and/or regulation of the torque and/or of the rotation of the torque generating unit 32a is effected on the basis of measuring data of the torque sensor 20a.

Figure 6:
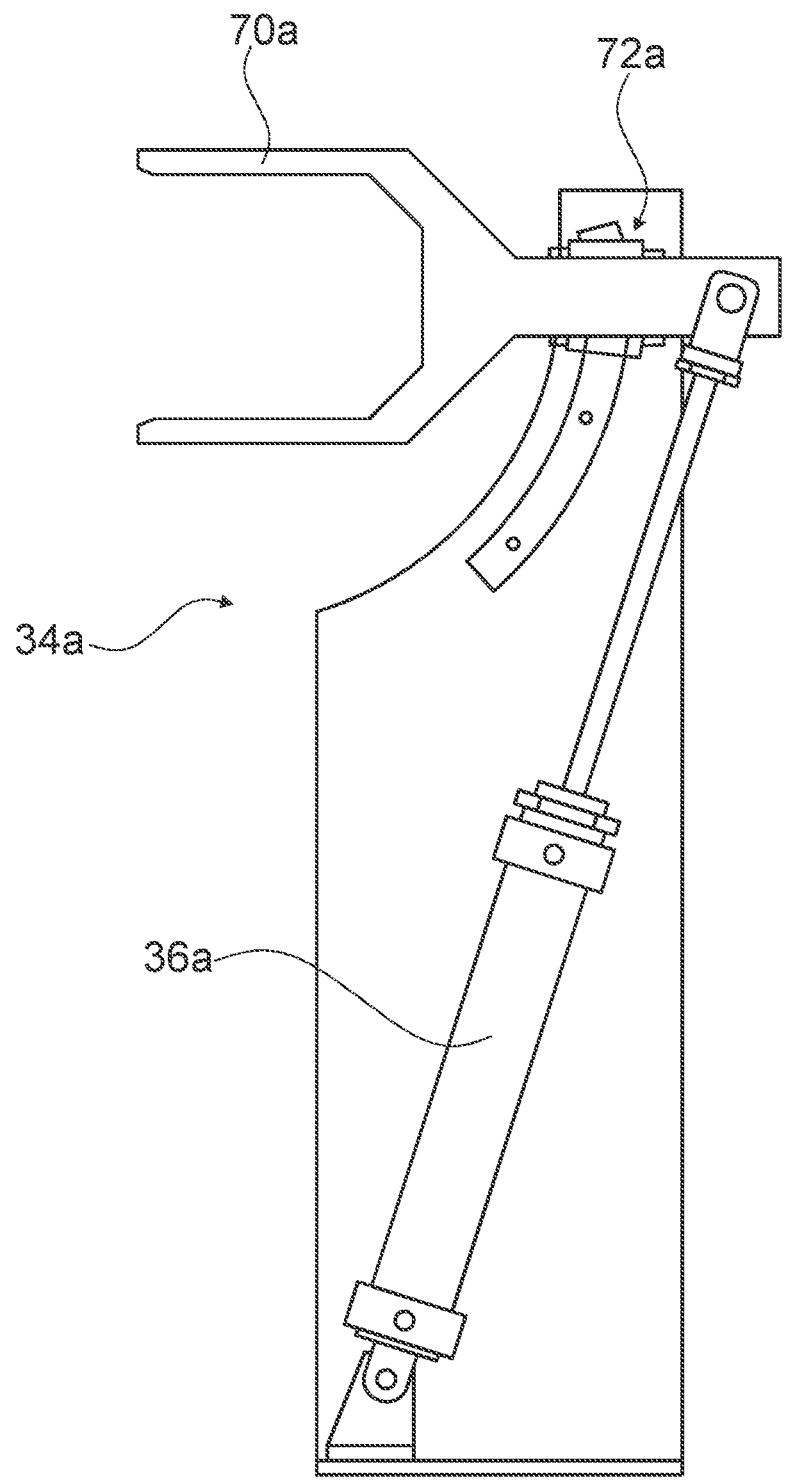

The tool clamping device comprises a further torque generating unit 34a (cf. FIG. 1, FIG. 5 or FIG. 6). The further torque generating unit 34a is embodied separately from the torque generating unit 32a. The further torque generating unit 34a is configured for a main tensioning of the union nut 12a. The further torque generating unit 34a is configured to generate a greater torque than the torque generating unit 32a. The further torque generating unit 34a comprises a corresponding coupling unit 70a. The corresponding coupling unit 70a is configured for a coupling with the coupling unit 46a of the attachment holder 44a. The corresponding coupling unit 70a is implemented in the shape of a jaw wrench. The corresponding coupling unit 70a, which is shaped like a jaw wrench, is configured to at least partly engage around the attachment holder 44a. The further torque generating unit 34a comprises a cam mechanism 72a. The cam mechanism 72a is configured to generate a rotary movement of the corresponding coupling unit 70a. The further torque generating unit 34a comprises a stroke element 36a. The stroke element 36a is embodied as a pneumatic stroke element 36a, in particular as a pneumatic cylinder. Alternatively the stroke element 36a may be embodied as a hydraulic stroke element or as an element with a motoric linear drive. The stroke element 36a is configured to generate a substantially linear stroke. The stroke element 36a is configured to generate the movement of the corresponding coupling unit 70a along the path defined by the cam mechanism 72a. The stroke element 36a is configured, in cooperation with the cam mechanism 72a, to generate a controllable and/or regulatable torque that is transferable, by means of the corresponding coupling unit 70a, to the attachment holder 44a and thus to the union nut 12a of the tool chuck 14a inserted in the attachment holder 44a.

The tool clamping device comprises an adjustment unit 38a. The adjustment unit 38a is configured to traverse the further torque generating unit 34a in a horizontal direction. The adjustment unit 38a is configured to establish and/or release the coupling between the coupling unit 46a and the corresponding coupling unit 70a by way of the horizontal traversing of the further torque generating unit 34a.

Figure 7:
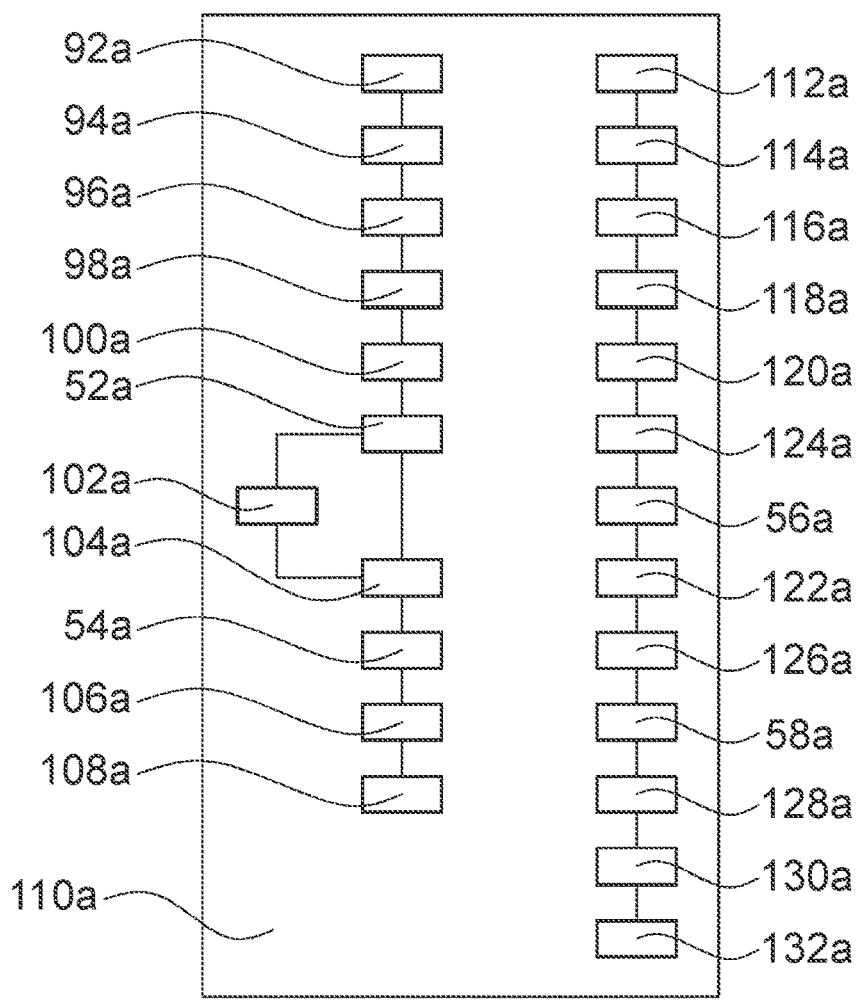

FIG. 7 shows a schematic flow chart of a method 110a with the automated tool clamping device, wherein the tool 10a is clamped in the tool chuck 14a by a tightening of the union nut 12a of the tool chuck 14a and/or is declamped from the tool chuck 14a by a release of the union nut 12a, wherein the clamp element 16a of the tool clamping device is connected to the union nut 12a of the tool chuck 14a by means of the largely force-fit connection and/or the form-fit connection, and wherein the torque occurring during the tool clamping process is received at least to a large extent by the torque receiving element 18a of the tool clamping device.

In a method for an automated clamping-in of the tool 10a in the tool chuck 14a, in at least one method step 92a the clamp element 16a is picked up by the handling robot 50a and is set upon the tool chuck 14a in which a tool 10a is plugged in. In at least one further method step 94a the clamp element 16a is jammed with the union nut 12a of the tool chuck 14a. In at least one further method step 96a the torque receiving element 18a is traversed, in particular lowered, by the vertical adjustment unit 40a. In at least one further method step 98a the torque receiving element 18a is lowered by the vertical adjustment unit 40a by such a distance that the torque transfer element 24a of the torque receiving element 18a is coupled with the torque transfer element 62a of the clamp element 16a in a rotationally fixed manner. In at least one further method step 100a the switch element 28a of the clamp element 16a is switched, via the actuation element 30a of the torque receiving element 18a, in such a way that the union nut 12a and the clamp element 16a are coupled with one another in a rotationally fixed manner, in a rotation direction that is configured for a tightening of the union nut 12a.

In at least one clamping-in step 52a the union nut 12a of the tool chuck 14a is tightened to a first limit torque by the torque generating unit 32a. In the tightening of the union nut 12a to the first limit torque, the instantaneous torque is monitored by the control and/or regulation unit 22a of the tool clamping device. The first limit torque is predetermined by the control and/or regulation unit 22a. It is herein conceivable that, in advance, the first limit torque is entered into the control and/or regulation unit 22a by a user manually or at least in a partially automated manner. In at least one further method step 102a the tool 10a, which is pre-tensioned with the first limit torque, is measured and/or preset, in particular measured and preset to length, via the tool presetting and/or tool measuring apparatus 42a. In at least one further method step 104a the corresponding coupling unit 70a of the further torque generating unit 34a is traversed towards the attachment holder 44a in a horizontal direction, wherein a coupling is generated between the further torque generating unit 34a and the attachment holder 4a.

In at least one further clamping-in step 54a, which in particular temporally follows the clamping-in step 52a, the union nut 12a of the tool chuck 14a is tightened to a second limit torque by the further torque generating unit 34a. The second limit torque is herein many times greater than the first limit torque. In the tightening of the union nut 12a to the second limit torque, the instantaneous torque is monitored by the control and/or regulation unit 22a of the tool clamping device. The second limit torque is predetermined by the control and/or regulation unit 22a. It is herein conceivable that the second limit torque is entered into the control and/or regulation unit 22a by a user in advance, manually or at least in a partially automated manner. Alternatively or additionally it is conceivable that, for setting the second limit torque, a movement of a marking on the union nut 12a and/or on the base body 86a of the tool chuck 14a is monitored via the optical measuring device 80a. For this purpose, for example a congruency of two markings on counter-rotated parts of the tool chuck 14a may be monitored. In at least one further method step 106a the coupling unit 46a of the attachment holder 44a and the corresponding coupling unit 70a of the further torque generating unit 34a are decoupled, wherein the further torque generating unit 34a is horizontally traversed away from the attachment holder 44a by means of the adjustment unit 38a. In at least one further method step 108a the jamming of the clamp element 16a with the union nut 12a is released and the clamp element 16a is taken off the tool chuck 14a by the handling robot 50a.

In a method for an automated declamping of the tool 10a from the tool chuck 14a, in at least one method step 112a, the clamp element 16a is picked up by the handling robot 50a and is set upon the tool chuck 14a, into which a tool 10a is clamped. In at least one further method step 114a the clamp element 16a is jammed with the union nut 12a of the tool chuck 14a. In at least one further method step 116a the torque receiving element 18a is traversed, in particular lowered, by the vertical adjustment unit 40a. In at least one further method step 118a the torque receiving element 18a is lowered by the vertical adjustment unit 40a by such a distance that the torque transfer element 24a of the torque receiving element 18a is coupled with the torque transfer element 62a of the clamp element 16a in a rotationally fixed manner. In at least one further method step 120a the switch element 28a of the clamp element 16a is switched, via the actuation element 30a of the torque receiving element 18a, in such a way that the union nut 12a and the clamp element 16a are coupled with each other, in a rotationally fixed manner, in a rotation direction that is configured for a release of the union nut 12a. In at least one further method step 124a the corresponding coupling unit 70a of the further torque generating unit 34a is traversed towards the attachment holder 44a in a horizontal direction, wherein a coupling is generated between the further torque generating unit 34a and the attachment holder 44a.

In at least one declamping step 56a the union nut 12a is unwound by the further torque generating unit 34a, in an automated manner, by a first number of rotations. Herein the first number of rotations is sensed by the angle sensor unit 48a and/or by the torque generating unit 32a. In at least one further method step 122a, if a release torque is not reached, the declamping step 56a, in particular the torque generation of the further torque generating unit 34a, is terminated. In at least one further method step 126a the coupling unit 46a of the attachment holder 44a and the corresponding coupling unit 70a of the further torque generating unit 34a are decoupled, wherein the further torque generating unit 34a is traversed horizontally away from the attachment holder 44a via the adjustment unit 38a.

In at least one further declamping step 58a, which in particular temporally follows the declamping step 56a, the union nut 12a is unwound by the torque generating unit 32a, which is embodied separately from the further torque generating unit 34a, in an automated manner, by a second number of rotations. Herein the second number of rotations is sensed by the angle sensor unit 48a and/or by the torque generating unit 32a. Beyond this, the total number of rotations is determined by the control and/or regulation unit 22a in the further declamping step 58a. In at least one further method step 128a, the further declamping step 58a, in particular a torque generation of the torque generating unit 32a, is stopped as soon as a limit value of the total number of rotations of the union nut 12a is exceeded. In at least one further method step 130a the clamp element 16a is taken off the tool chuck 14a by the handling robot 50a. In at least one further method step 132a the tool 10a is removed out of the tool chuck 14a.

Figure 8:
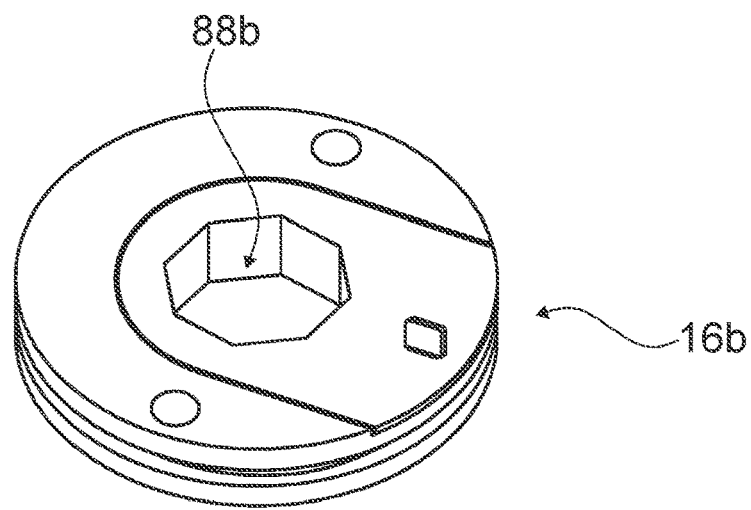

In FIG. 8 another exemplary embodiment of the invention is shown. The following description and the drawing are substantially limited to the differences between the exemplary embodiments, wherein regarding identically denominated structural components, in particular regarding structural components having the same reference numerals, the drawings and/or the description of the other exemplary embodiment of FIGS. 1 to 7 may principally also be referred to. To distinguish between the exemplary embodiments, the letter a has been added to the reference numerals of the exemplary embodiment in FIGS. 1 to 7. In the exemplary embodiment of FIG. 8 the letter a has been substituted by the letter b.

FIG. 8 shows an alternative clamp element 16b of an automated tool clamping device. The clamp element 16b comprises a recess 88b. The recess 88b has an octagonal prism shape. The octagonal prism shape of the recess 88b is adapted to an outer shape of an alternative union nut 12b of an alternative tool chuck 14b, in particular to a tool surface of the alternative union nut 12b of the alternative tool chuck 14b. Alternatively the recess 88b may have another outer shape that differs from an octagonal prism shape, corresponding to a union nut 12b.

The invention claimed is:

1. An automated tool clamping device, which is configured for a clamping-in of at least one tool in a tool chuck by tightening of a union nut of the tool chuck or for declamping of the tool out of the tool chuck by loosening of the union nut, with a clamp element, which is configured to generate a connection with the union nut of the tool chuck, and with a torque receiving element, which is configured to receive at least a large portion of a torque occurring during a tool clamping process, wherein the clamp element and the torque receiving element are implemented separately from each other in such a way that the clamp element may be loosely set onto the tool chuck and loosely removed from the tool chuck and in such a way that the clamp element can be removably decoupled from the torque receiving element, wherein the torque receiving element comprises at least one torque transfer element, which is configured for a temporary rotationally fixed coupling between the torque receiving element and the clamp element in such a way that a relative rotation of the torque receiving element and the clamp element is forestalled via a mutual engagement with at least one corresponding torque transfer element of the clamp element.

2. The tool clamping device according to claim 1, wherein the clamp element is configured to generate a force-fit connection with the union nut of the tool chuck.

3. The tool clamping device according to claim 1, wherein the torque receiving element comprises a torque sensor.

4. The tool clamping device according to claim 1, further comprising at least one control or regulation unit, which is configured for control or regulation of a course of a torque that is exerted on the union nut by the tool clamping device in the tool clamping process, or for setting at least a maximum torque that is exerted onto the union nut by the tool clamping device in the tool clamping process.

5. The tool clamping device according to claim 1, wherein the clamp element comprises a connection mechanism, for generation of the connection with the union nut, said connection mechanism being implemented to be operable like a ratchet.

6. The tool clamping device according to claim 1, further comprising at least one torque generating unit, which is implemented separately from the clamp element or from the torque receiving element and which is configured to generate a torque that is required for the tool clamping process.

7. The tool clamping device according to claim 6, further comprising at least one further torque generating unit, which is configured separately from the torque generating unit.

8. The tool clamping device according to claim 7, wherein the torque generating unit is configured for a pre-tensioning of the union nut, and that the further torque generating unit is configured for main tensioning of the union nut.

9. The tool clamping device according to claim 7, wherein the further torque generating unit comprises a stroke element for generation of a linear stroke.

10. The tool clamping device according to claim 7, further comprising at least one adjustment unit, which is configured to traverse the further torque generating unit in at least one spatial direction.

11. The tool clamping device according to claim 1, further comprising at least one vertical adjustment unit, which is configured to permit a vertical traversing of the torque receiving element.

12. A tool presetting and tool measuring apparatus, which is configured at least for a presetting and a measuring of a tool that is clamped in a tool chuck, with the automated tool clamping device according to claim 1, and with an attachment holder, which is configured for rotationally fixed accommodation, of a tool chuck, wherein the attachment holder comprises at least one coupling unit, which is configured for a rotationally fixed coupling of the attachment holder with at least one of the torque generating units of the tool clamping device.

13. The tool presetting and tool measuring apparatus according to claim 12, further comprising an angle sensor unit, which is configured to sense a rotation angle, a rotation direction or a rotation speed of the attachment holder.

14. A method with the automated tool clamping device according to claim 1, wherein the tool is clamped into the tool chuck by tightening of the union nut of the tool chuck or is declamped from the tool chuck by release of the union nut, wherein the clamp element of the tool clamping device is connected with the union nut of the tool chuck by a jamming connection, or by a form-fit connection, and wherein the torque occurring during a tool clamping process is received by the torque receiving element of the tool clamping device at least to a large extent, wherein the clamp element and the torque receiving element are implemented separately from each other in such a way that the clamp element may be loosely set onto the tool chuck and loosely removed from the tool chuck and in such a way that the clamp element can be removably decoupled from the torque receiving element.

15. A method for an automated clamping-in of a tool in a tool chuck comprising a union nut by means of a tool clamping device according to claim 14, wherein in at least one clamping-in step the union nut of the tool chuck is tightened to a first limit torque, and that in at least one further clamping-in step, the union nut of the tool chuck is tightened to a second limit torque, wherein a torque for tightening of the union nut in the two clamping-in steps is generated by torque generating units which are embodied separately from one another and are operated in an automated manner.

16. The method according to claim 15, wherein at least the first limit torque or at least the second limit torque is predetermined or monitored by a control or regulation unit of the tool clamping device, and wherein the second limit torque is many times greater than the first limit torque.

17. A method for automated declamping of a tool from a tool chuck comprising a union nut by means of a tool clamping device according to claim 14, wherein in at least one declamping step the union nut of the tool chuck is unwound, in an automated manner, by a first number of rotations by means of a further torque generating unit of the tool clamping device, that in at least one further declamping step the union nut of the tool chuck is unwound, in an automated manner, by a second number of rotations by a torque generating unit of the tool clamping device, which is embodied separately from the further torque generating unit, and that the total number of rotations is sensed by the torque generating unit or by an angle sensor unit of the tool clamping device.

18. The method according to claim 17, wherein, if a release torque is not reached, the declamping step is terminated and the further declamping step is started.

19. The method according to claim 17, wherein the further declamping step is stopped as soon as a limit value of a total number of rotations of the union nut is exceeded, wherein the total number of rotations is calculated by an addition of the sensed first number of rotations and the sensed second number of rotations.

20. An automated tool clamping device, which is configured for a clamping-in of at least one tool in a tool chuck by a tightening of a union nut of the tool chuck or for a declamping of the tool out of the tool chuck by a loosening of the union nut, with a clamp element, which is configured to generate a connection with the union nut of the tool chuck, and with a torque receiving element, which is configured to receive at least a large portion of a torque occurring during a tool clamping process, wherein the clamp element and the torque receiving element are implemented separately from each other in such a way that the clamp element may be loosely set onto the tool chuck and loosely removed from the tool chuck and in such a way that the clamp element can be moved decoupled from the torque receiving element, wherein the tool clamping device comprises at least one torque generating unit, which is implemented separately from the clamp element or from the torque receiving element and which is configured to generate a torque that is required for the tool clamping process, wherein the tool clamping device comprises at least one further torque generating unit, which is embodied separately from the torque generating unit, and wherein the further torque generating unit comprises a stroke element for a generation of a linear stroke.

21. An automated tool clamping device, which is configured for a clamping-in of at least one tool in a tool chuck by a tightening of a union nut of the tool chuck or for a declamping of the tool out of the tool chuck by a loosening of the union nut, with a clamp element, which is configured to generate a connection with the union nut of the tool chuck, and with a torque receiving element, which is configured to receive at least a large portion of a torque occurring during a tool clamping process, wherein the clamp element and the torque receiving element are implemented separately from each other in such a way that the clamp element may be loosely set onto the tool chuck and loosely removed from the tool chuck and in such a way that the clamp element can be moved decoupled from the torque receiving element, wherein the tool clamping device comprises at least one torque generating unit, which is implemented separately from the clamp element or from the torque receiving element and which is configured to generate a torque that is required for the tool clamping process, wherein the tool clamping device comprises at least one further torque generating unit, which is embodied separately from the torque generating unit, and wherein the tool clamping device comprises at least one adjustment unit, which is configured to traverse the further torque generating unit in at least one spatial direction.

* * * * *